(12) United States Patent
Larson

(10) Patent No.: US 7,613,731 B1
(45) Date of Patent: Nov. 3, 2009

(54) METHOD OF ANALYSIS, ABSTRACTION, AND DELIVERY OF ELECTRONIC INFORMATION

(75) Inventor: Craig Larson, Jasper, GA (US)

(73) Assignee: Quantum Reader, Inc., Marietta, GA (US)

( * ) Notice: Subject to any disclaimer, the term of this patent is extended or adjusted under 35 U.S.C. 154(b) by 297 days.

(21) Appl. No.: 10/857,550

(22) Filed: May 28, 2004

Related U.S. Application Data

(60) Provisional application No. 60/477,641, filed on Jun. 11, 2003.

(51) Int. Cl.
  *G06F 17/00* (2006.01)
  *G06F 17/30* (2006.01)
  *G09B 17/00* (2006.01)

(52) U.S. Cl. .................. 707/104.1; 707/6; 434/178; 434/179; 434/184; 715/230

(58) Field of Classification Search .............. 707/6, 707/104.1; 715/526, 230; 434/178, 179, 434/184
See application file for complete search history.

(56) References Cited

U.S. PATENT DOCUMENTS

| | | | |
|---|---|---|---|
| 4,160,242 A | | 7/1979 | Fowler et al. |
| 4,833,610 A | * | 5/1989 | Zamora et al. ............. 707/5 |
| 4,845,645 A | | 7/1989 | Martin et al. |
| 5,147,205 A | * | 9/1992 | Gross et al. ............... 434/169 |
| 5,197,005 A | | 3/1993 | Shwartz et al. |
| 5,383,120 A | * | 1/1995 | Zernik ...................... 704/10 |

(Continued)

FOREIGN PATENT DOCUMENTS

EP   1205903   5/2002

(Continued)

OTHER PUBLICATIONS

Harper, David J., et al., "Query-Based Document Skimming: A User-Centred Evaluation of Relevance Profiling", ECIR 2003, Pisa, Italy, Apr. 14-16, 2003, pp. 377-392.*

(Continued)

*Primary Examiner*—Robert Stevens
(74) *Attorney, Agent, or Firm*—Duane Morris LLP

(57) ABSTRACT

This invention is a method of analyzing and preparing electronic text in such a way as to set values for each word in terms of recognizability, comprehensibility, and parts of speech for later emphasis and marking for printing or display on an electronic device. When used on electronic display devices it further employs methods which permit the user to limit eye movement by displaying such text one or a few words at a time. This invention also enhances the ability of small electronic devices to display textual information by providing a method of display which is more suitable for small display areas. The invention is made up of two sections. The first analyzes the text to be displayed and grades each word in such a way as to substantially anticipate the difficulty in understanding each word the reader will have when it subsequently is displayed. The first section then tags each word with several values creating a file which can then be read by the second section which then uses the tags to determine how the word is to be displayed. Emphasis and de-emphasis is provided through length of display, color, size, and opacity. Provision is also made for the inclusion of graphics, videos, and audio.

100 Claims, 5 Drawing Sheets

U.S. PATENT DOCUMENTS

| | | | |
|---|---|---|---|
| 5,557,722 A * | 9/1996 | DeRose et al. | 715/234 |
| 5,566,289 A | 10/1996 | Ikeo et al. | |
| 5,778,400 A * | 7/1998 | Tateno | 715/513 |
| 5,802,533 A | 9/1998 | Walker | |
| 5,873,109 A | 2/1999 | High | |
| 5,930,393 A * | 7/1999 | Ho et al. | 382/225 |
| 5,943,679 A * | 8/1999 | Niles et al. | 715/526 |
| 5,950,187 A * | 9/1999 | Tsuda | 707/3 |
| 5,963,205 A * | 10/1999 | Sotomayor | 715/531 |
| 6,056,551 A | 5/2000 | Marasco | |
| 6,098,085 A * | 8/2000 | Blonder et al. | 715/208 |
| 6,128,634 A * | 10/2000 | Golovchinsky et al. | 715/526 |
| 6,128,635 A * | 10/2000 | Ikeno | 715/246 |
| 6,130,968 A * | 10/2000 | McIan et al. | 382/309 |
| 6,154,757 A * | 11/2000 | Krause et al. | 715/205 |
| 6,175,843 B1 | 1/2001 | Muramoto et al. | |
| 6,182,098 B1 | 1/2001 | Selker | |
| 6,279,017 B1 | 8/2001 | Walker | |
| 6,457,026 B1 * | 9/2002 | Graham et al. | 715/234 |
| 6,515,690 B1 | 2/2003 | Back et al. | |
| 6,553,373 B2 * | 4/2003 | Boguraev et al. | 707/5 |
| 6,629,097 B1 * | 9/2003 | Keith | 707/5 |
| 6,633,855 B1 * | 10/2003 | Auvenshine | 706/15 |
| 6,738,786 B2 * | 5/2004 | Sugaya et al. | 707/104.1 |
| 6,778,970 B2 * | 8/2004 | Au | 706/55 |
| 6,865,572 B2 * | 3/2005 | Boguraev et al. | 707/5 |
| 7,207,003 B1 * | 4/2007 | Berstis et al. | 715/207 |
| 2002/0109728 A1 | 8/2002 | Tiongson et al. | |
| 2002/0116420 A1 | 8/2002 | Allam et al. | |
| 2002/0133480 A1 | 9/2002 | Boguraev et al. | |
| 2003/0013073 A1 * | 1/2003 | Duncan et al. | 434/317 |
| 2003/0038754 A1 * | 2/2003 | Goldstein et al. | 345/7 |
| 2003/0043196 A1 * | 3/2003 | Gibson | 345/776 |
| 2003/0051214 A1 * | 3/2003 | Graham et al. | 715/512 |
| 2003/0084404 A1 | 5/2003 | Dweck et al. | |
| 2003/0158843 A1 | 8/2003 | Boguraev et al. | |
| 2003/0184560 A1 | 10/2003 | Pierce | |
| 2003/0191627 A1 * | 10/2003 | Au | 704/9 |
| 2003/0235807 A1 * | 12/2003 | Paley | 434/178 |
| 2004/0024747 A1 | 2/2004 | Boguraev et al. | |
| 2004/0073873 A1 * | 4/2004 | Croney et al. | 715/526 |
| 2004/0080532 A1 * | 4/2004 | Cragun et al. | 345/745 |
| 2004/0107195 A1 | 6/2004 | Trepess | |
| 2004/0119684 A1 | 6/2004 | Back et al. | |
| 2004/0150657 A1 | 8/2004 | Wittenburg et al. | |
| 2004/0233160 A1 | 11/2004 | Chincholle et al. | |

FOREIGN PATENT DOCUMENTS

| | | |
|---|---|---|
| WO | WO 01/80027 | 10/2001 |
| WO | WO 02/37256 | 5/2002 |

OTHER PUBLICATIONS

Savage, Josh, "Speed-Dependent Automatic Zooming", Canterbury University CS Honours Reports, Christchurch, New Zealand, Aug. 2002, pp. 1-32.*

Zhu, Yimin, et al., "Viewer Controllable Visualization for Construction Document Processing", Automation in Construction, vol. 12, Issue 3, May 2003, pp. 255-269.*

Harper, David J., et al., "A Language Modelling Approach to Relevance Profiling for Document Browsing", JCDL '02, Portland, OR, Jul. 13-17, 2002, pp. 76-83.*

Graham, Jamey, "The Reader's Helper: A Personalized Document Reading Document", CHI '99, Pittsburgh, PA, May 15-20, 1999, pp. 481-488 and 628.*

"Form 8-K for Vubotics, Inc.", Yahoo! Finance, downloaded from biz.yahoo.com/e/071005/vbtc.ob8-k.html, Nov. 14, 2007, 1 page.*

Boguraev, Branimir, et al., "Dynamic Presentation of Phrasally-Based Document Abstractions", HICSS-32, Maui, HI, Jan. 5-8, 1999, pp. 1-10.*

Forlizzi, Jodi, et al., "The Kinedit System: Affective Messages Using Dynamic Texts", CHI 2003, vol. 5, No. 1, Ft. Lauderdale, FL, Apr. 5-10, 2003, pp. 377-384.*

Anick, Peter G., "Exploiting Clustering and Phrases for Context-Based Information Retrieval", SIGIR '97, Philadelphia, PA, © 1997, pp. 314-323.*

Hodas, Joshua S., et al., "NOVeLLA: A Multi-Modal Electronic-Book Reader With Visual and Auditory Interfaces", International Journal of Speech Technology, vol. 4, Nos. 3-4, Jul. 2001, pp. 269-284.*

Microsoft Computer Dictionary, 4th Edition, Microsoft Press, Redmond, WA, © 1999, p. 123.*

Goldstein, et al. "Enhancing the Reading Experience: Sonified On-Line Speed-Reading from a PDA Screen Using RSVP", Ericsson Research, Usability & Interaction Lab.

Russel, et al., "Reading with RSVP on a Small Screen: does Font Size Matter?" *Usability News*, Mar. 1, 2001.

Castelhano, et al., "Optimizing the Reading of Electronic Text Using Rapid Serial Visual Presentation," *Behaviour & Information Technology*, 20(4), pp. 237-247.

Goldstein, et al., "Enhancing the Reading Experience: Using Adaptive and Sonified RSVP for Reading on Small Displays," Ericsson Research, Usability & Interaction Lab.

Back, et al., The Airbook: Force-Free Interaction with Dynamic Text in an Assistive Reading Device, Xerox PARC.

Goldstein, et al. "Enhancing the Reading Experience: Sonified On-Line Speed-Reading from a PDA Screen Using RSVP", Ericsson Research, Usability & Interaction Lab, 2 pages, Feb. 16, 2005.

Russel, et al., "Reading with RSVP on a Small Screen: does Font Size Matter?" *Usability News*, Mar. 1, 2001, 5 pages.

Castelhano, et al., "Optimizing the Reading of Electronic Text Using Rapid Serial Visual Presentation," *Behaviour & Information Technology*, 20(4), pp. 237-247, Feb. 16, 2005.

Goldstein, et al., "Ehnancing the Reading Experience: Using Adaptive and Sonified RSVP for Reading on Small Displays," Ericsson Research, Usability & Interaction Lab, 6 pages, Feb. 16, 2005.

Back, et al., The Airbook: Force-Free Interaction with Dynamic Text in an Assistive Reading Device, Xerox PARC, 2 pages, Feb. 16, 2005.

* cited by examiner

Module Flow Diagram

Collection and Annotation Module

Subjective Analysis
Module**

Objective Analysis Module

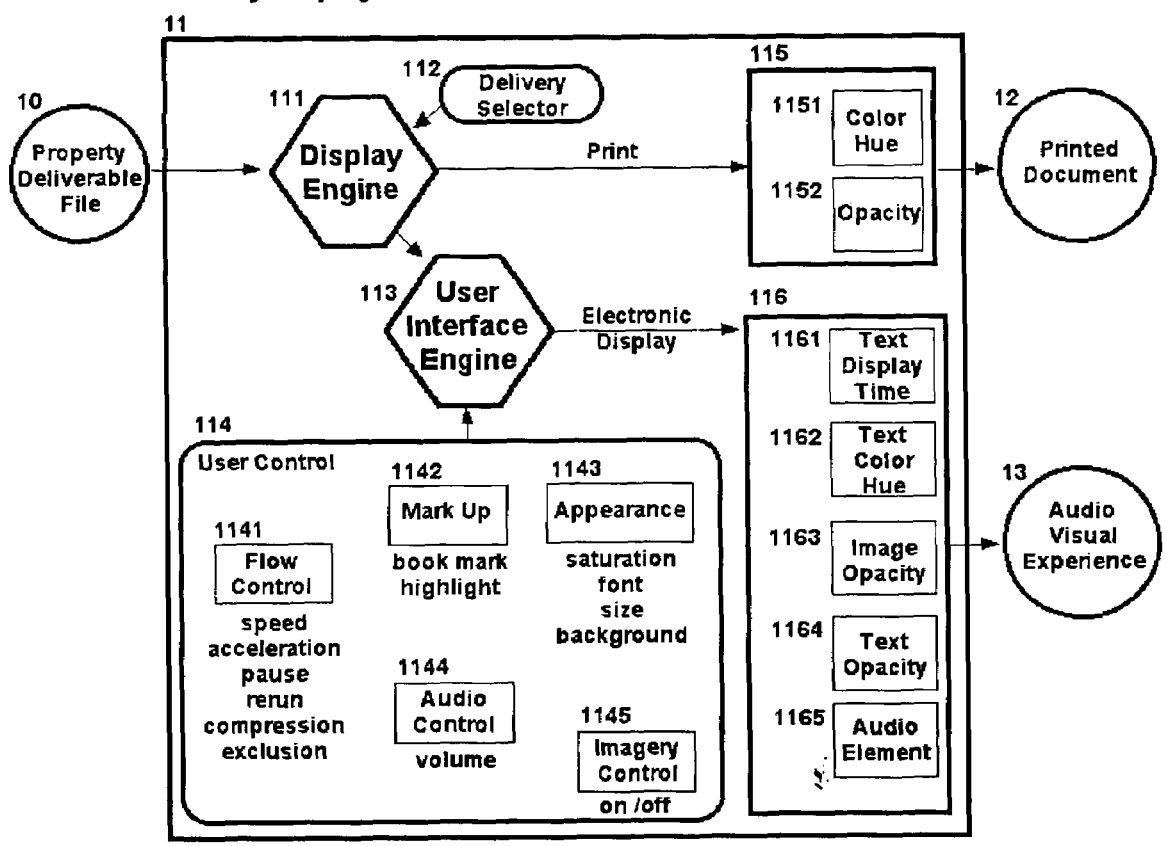
FIG. 5 Delivery Display Module

METHOD OF ANALYSIS, ABSTRACTION, AND DELIVERY OF ELECTRONIC INFORMATION

CROSS-REFERENCE TO RELATED APPLICATIONS

This application claims priority to U.S. provisional patent application Ser. No. 60/477,641, filed Jun. 11, 2003, which is relied on and incorporated herein by reference.

TECHNICAL FIELD OF THE INVENTION

This invention relates to text processing and more particularly, systems for computational linguistics and more particularly to a method and apparatus for annotating documents, either automatically or manually, for the purpose of displaying text more effectively.

BACKGROUND OF THE INVENTION

Research into eye movement during the visual reading process began around 1879 by a French ophthalmologist, Professor Emile Javal. He concluded that the eyes stop on every word while reading. Professor Javal showed that the eyes could process several letters, and possibly multiple words per glance. He further determined that rather than move in a continuous sweeping motion, the eyes move in alternating jumps and pauses across a line of text. The jumping movements, called saccades, take approximately 20 milliseconds, while the pauses (referred to as fixations) last approximately 150-300 milliseconds. It is only during the fixations, when the eyes are still, that reading can take place.

The US Air Force originally used tachistoscopic devices to aid pilots in identifying aircraft by gradually reducing the size and time of flashing images. This technique was later adapted to flashing words. Though showing promise, the technology of the time limited its practical use.

From its inception the computer has been under scrutiny with regard to human interaction. Countless studies and experiments have been conducted specific to productivity and how conveyance of the written word could be communicated more effectively. Though modern computers offer many possibilities for the display of text not available previously, most computer applications display text in a way similar to that of paper. Not only does this not take advantage of the possibilities available through computer technology, but in many ways is inferior to that of paper. One alternative, however, uses a completely different approach. Rather than emulating the look of a page, the zero eye movement (ZEM) method (also referred to as rapid serial visual presentation (RSVP)) presents words singularly or in small groups, replacing one image by another within the same field of focus. Information delivered with this method eliminates the time wasted while moving the eyes and improves reading speed. This delivery technique also reduces eye muscle fatigue and in turn, the effects associated with disabilities such as Muscular Degeneration and Dyslexia, as well as assisting those with impaired vision. Though products based upon this technique have been offered, none have been commercially successful. This may be explained by the fact that the flow of the information has been independent of its comprehensibility to the user.

This method describes a process of displaying words in a manner which takes into account context, number of characters, relevance, similarity and familiarity. Through analysis of the text for these characteristics, values are assigned to each word and display is effected dynamically. My invention analyzes documents, creates a table of values for each word, analyzes each word in relation to others in each sentence, paragraph and document and then assigns to it a value which is used to display the word in a manner most conducive to comprehension. In addition to the length of time each word is displayed other means of varying emphasis are employed. These include the varying of color, size, transparency background and position on the screen. Although the main use of such analysis is for the display on an electronic device the values could also be used to vary the appearance of printed text.

Analysis of documents to determine the difficulty for the reader has long been practiced. For instance, Gunning's Fog Index derives a readability quotient by counting the number of characters, words, sentences, and paragraphs, and then through a formula of averaging and calculation assigns a grade of difficulty. Other similar analysis methods have been developed for individual words for assessing values to words as objects.

SUMMARY OF THE INVENTION

The present invention describes a process of displaying words in a manner which takes into account context, number of characters, relevance, similarity and familiarity. Through analysis of the text for these characteristics, values are assigned to each word and display is effected dynamically.

The present invention analyzes documents, creates a table of values for each word, analyzes each word in relation to others in each sentence, paragraph and document and then assigns to it a value which is used to display the word in a manner most conducive to comprehension. In addition to the length of time each word is displayed other means of varying emphasis are employed. These include the varying of color, size, transparency, background and position on the screen. Although the main use of such analysis is for the display on an electronic device, the values could also be used to vary the appearance of printed text.

In one aspect of the invention, a system is provided for presenting a plurality of words in an electronic document to a viewer to facilitate comprehension and control display and speed of delivery. A plurality of knowledge databases are used in assigning a value to each word in the electronic document. The system includes an annotation module having a cognitive cluster parser and an analysis engine that interact with the plurality of knowledge databases to generate a first tagged file of assigned values for each word. A subjective analysis module having a compiler engine and an author interface processes the first tagged file to generate a second tagged file of values. An objective analysis module having a property editor processes the second tagged file to generate a property deliverable file that dynamically controls the sequential presentation of the words in the electronic document to the viewer. The system also includes a delivery display module operative with the property deliverable file to print or display the words in the electronic document.

In another aspect of the invention, a method is provided for presenting a plurality of words in an electronic document to a viewer to facilitate comprehension and control display and speed of delivery. The method includes assigning a value to each word in the electronic document using a knowledge database; generating a first tagged file of assigned values for each word; processing the first tagged file to generate a second tagged file of values; processing the second tagged file to generate a property deliverable file that dynamically controls the sequential presentation of the words in the electronic document to the viewer; and presenting the words in the electronic document to the viewer on a display device or printer.

BRIEF DESCRIPTION OF THE DRAWINGS

FIG. 5 is a more detailed illustration of the Delivery Display Module of the program in an embodiment of the invention.

DETAILED DESCRIPTION OF THE INVENTION

Figure 1:
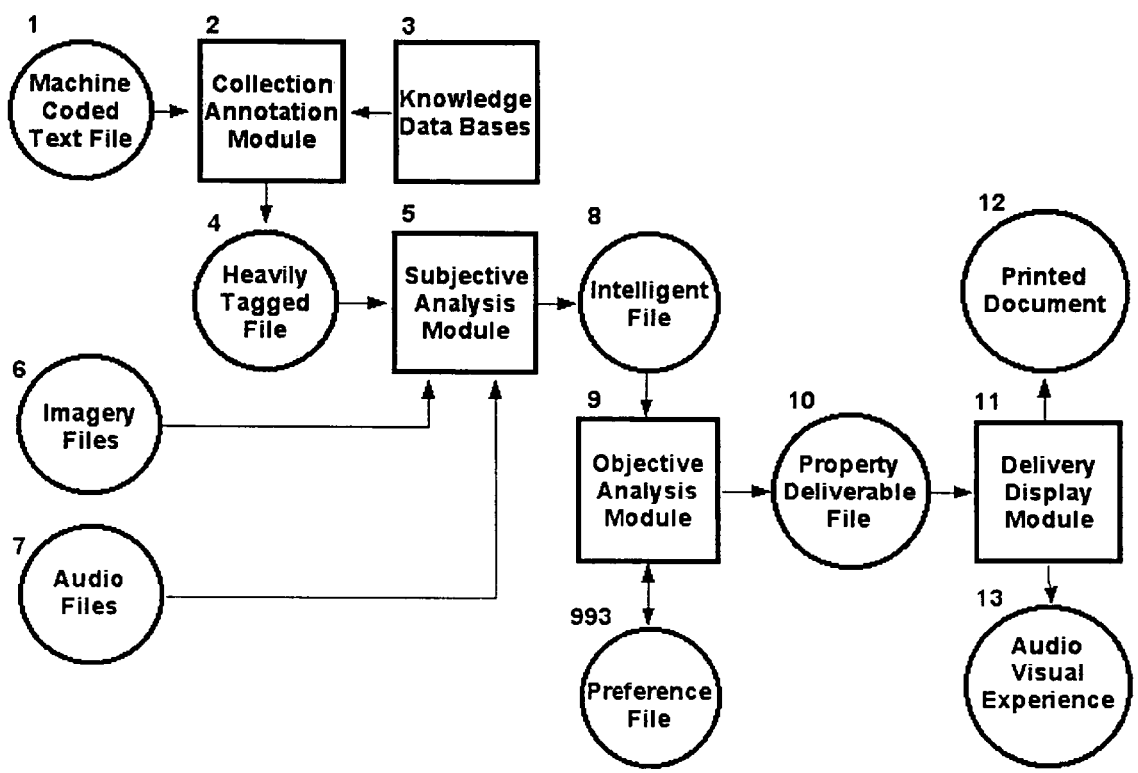
FIG. 1 is a block diagram illustrating the basic flow of the program in an embodiment of the invention.

FIG. 1 shows a basic flow chart illustrating the processing and combining of several files and their eventual display according to values attached to the files during the processing. This invention processes a Machine Coded Text File 1 through a Collection Annotation Module 2 using a collection of Knowledge Data Bases 3 to create a Heavily Tagged File 4 which is further refined and can be combined with Imagery Files 6 and Audio Files 7 through a Subjective Analysis Module 5 to create an Intelligent File 8. The Intelligent File 8 can then be further processed and modified through the Objective Analysis Module 9 using a Preference File 993 to create a Property Deliverable File 11 which can then be played through the Delivery Display Module 11 to create a Printed Document 12 or a Visual Audio Experience 13.

Figure 2:
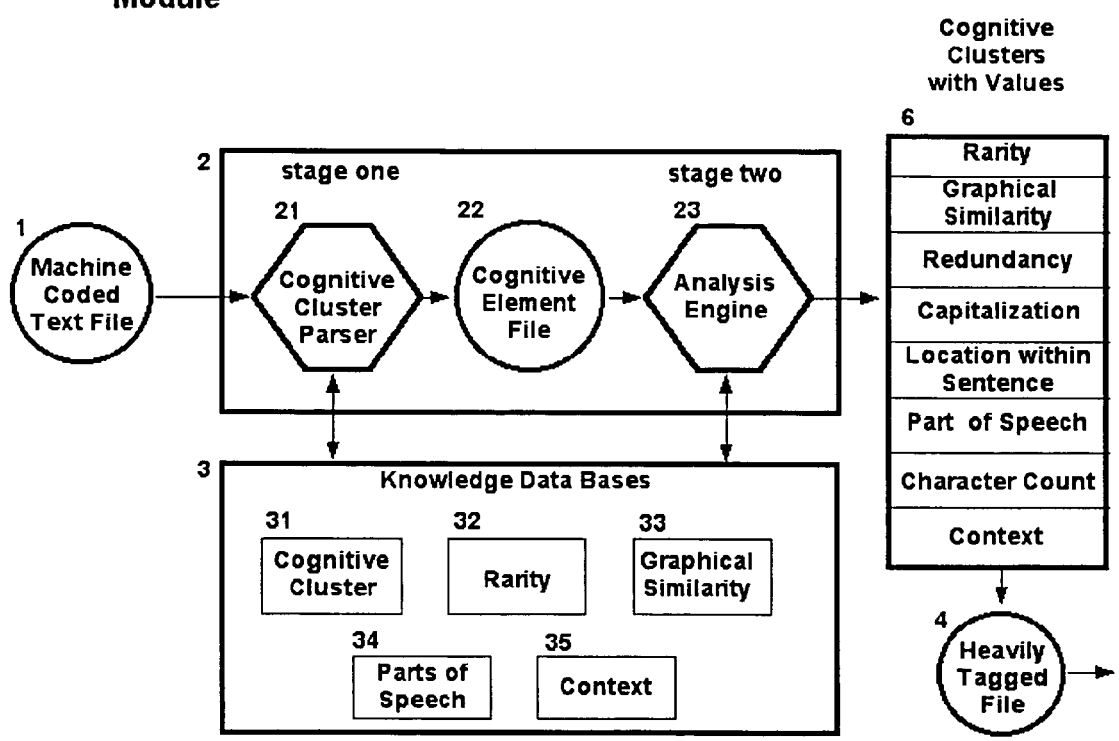
FIG. 2 is a more detailed illustration of the Collection and Annotation Module of the program in an embodiment of the invention.

In greater detail, this invention processes a machine coded text file 1 such as an ASCII or a word processor file and can combine it with Imagery files 6 (graphical or video) and/or audio files 7. It sequentially tags each word for the purpose of later emphasis (or de-emphasis) through a process of analysis and valuing. This analysis, valuing, and tagging is done in several stages. The first stage, which takes place in the Analysis and Annotation Module depicted in FIG. 2, analyzes the text for small groups of words which are usually read together with one pause of the eye. The Cognitive Cluster Parser 21 compares text to a Cognitive Cluster Knowledge Data Base 31 contained within the collection of Knowledge Data Bases 3. Such common word pairings as "no one" and "in to" are grouped so that afterwards they will be treated as one word, a cognitive cluster. The resulting Cognitively Parsed File 22 is then analyzed in the second stage by the Analysis Engine 3. The Analysis Engine 23 accesses the Knowledge Data Bases 3 and performs analysis on the file to create values for rarity, graphical similarity, redundancy, capitalization, sentence position, part of speech, character count, and context.

In the first of these processes, each word is compared to a Rarity Data Base 32 for the language and is assigned a value from the knowledge base indicating its rarity of use in the language as a whole. A high rarity value indicates comparative rarity. Alternatively, this knowledge base can be customized for various disciplines so that words that are rare in common use but not so rare in a particular discipline are not given higher weight than is necessary for the intended reader. In the second process, each word is compared to a Graphical Similarity Data Base 33 of words which are graphically similar to other words. If found there it is given a value. A greater value indicates that the word is more easily mistaken for another graphically similar word than a word given a lesser value. In the third process, each word is given a redundancy value. To derive this value each word is compared to each subsequent word in the document and each subsequent reappearance of the word is given a value of one for each reappearance. The fourth of these processes analyzes each word in the document and values those that are capitalized. The fifth process analyzes the document for the relative position of each word in a sentence and sets a value according to its position. The sixth process compares each word along with its surrounding words with a Parts of Speech Data Base 34 to determine its part of speech. A value is then assigned according to its part of speech. The seventh process counts each character in the word or cognitive cluster and assigns that value as a tag. The eighth process compares each word along with the words which surround it to a Contextual Data Base and computes a value of importance based upon context. These values are all tagged to each individual word to create a Heavily Tagged File 4.

Figure 3:
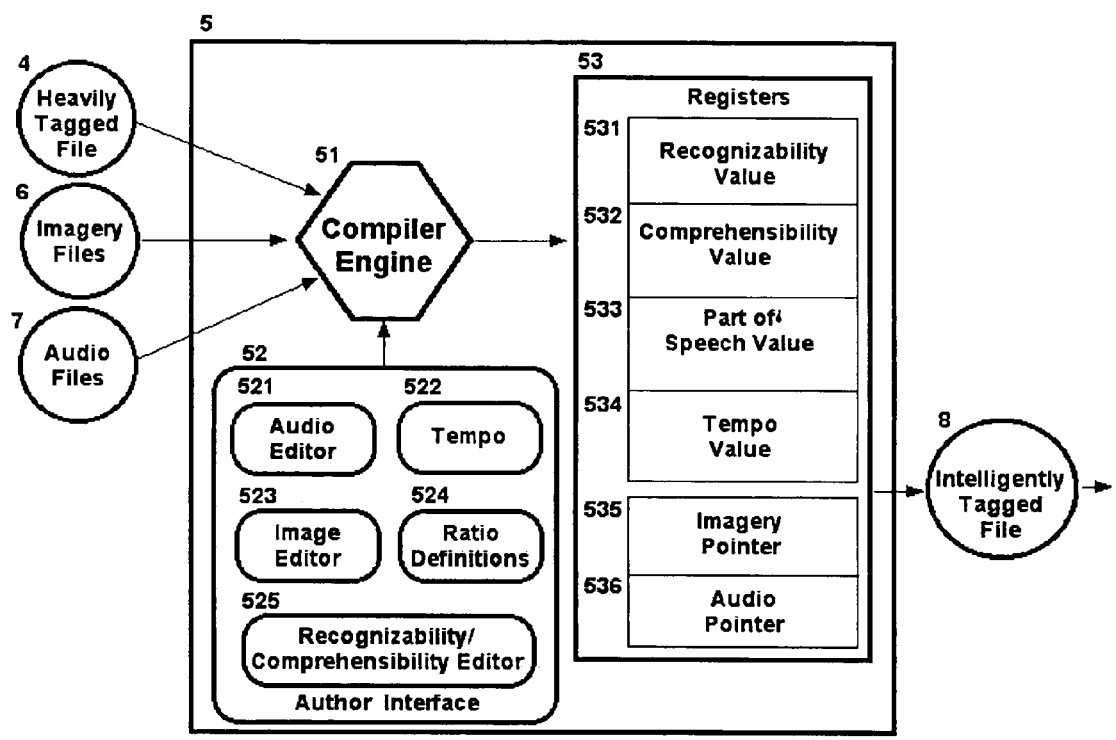
FIG. 3 is a more detailed illustration of the Subjective Analysis Module of the program in an embodiment of the invention.

The Subjective Analysis Module depicted in FIG. 3 further processes the Heavily Tagged File 4. The Compiler Engine 51 uses the values in this file to derive values for Recognizability 531 and Comprehensibility 532. Each of these two values are a result of applying an algorithm to some or all of the values previously generated. The choice of which of these values is used and how much weight is assigned to each value is given to the operator using the Ratio Definitions function 524 of the Author Interface 52. These values are the first and second tags used to create an Intelligently Tagged File 8. The third value tagged to each word is the Part of Speech Value 533 which is passed on unchanged to this file. Using the Tempo function 522 of the Author Interface 52, the operator can optionally add a Tempo Value Tag 534 to each word. This tag enables an author or editor to differentiate the tempo at which the sections of the document are presented on an electronic device. This value can also be manipulated to gradually accelerate or slow down the tempo of the presentation by computationally adding or subtracting from its value gradually between two points in the text. The operator can also add Imagery Files 6, and Audio Files 7 to a document at this point and attach them to the appropriate place in the file. Using the Audio Editor function 521 and the Image Editor function 523 of the Author Interface 52, the operator can attach tags to any word or cognitive cluster to act as a pointer to call up a file with performance instructions. The instructions could include length of time presented; whether or not the Imagery file 6 or Audio file 7 interrupts the flow of text; or, its opacity if an Imagery file, or volume if an Audio file. These tags are the fifth (Imagery Pointer 535) and sixth (Audio Pointer 536) tags. It may be that an author or editor will want certain words or sections of the document to be given more emphasis or special consideration. For this purpose, using Recognizability/Comprehensibility Editor 525 function of the Author Interface 52, each of these tags (Recognizability 531 and Comprehensibility 532) can be edited on an individual word (or cognitive cluster), sentence, paragraph, or section basis of the document. The resulting Intelligently Tagged File 8 can then be used on the same machine or sent to other machines for presentation.

Figure 4:
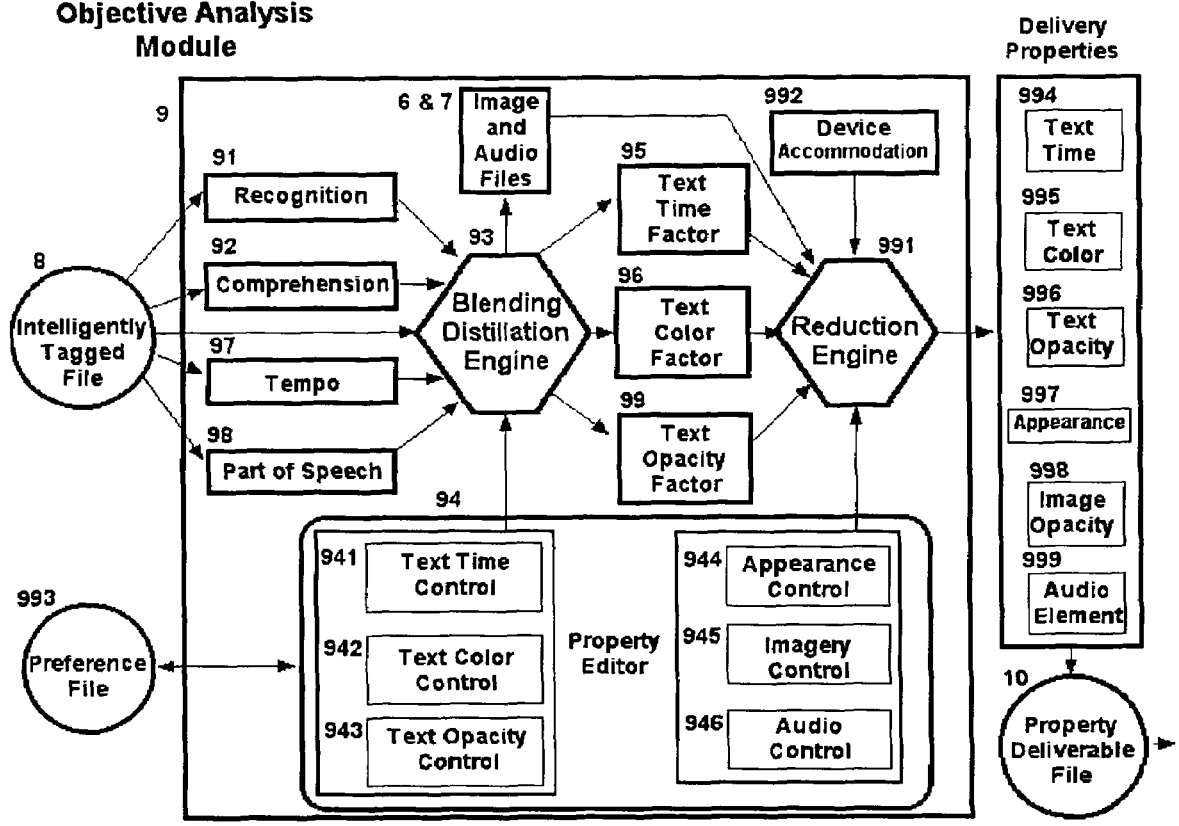
FIG. 4 is a more detailed illustration of the Objective Analysis Module of the program in an embodiment of the invention.

The Intelligently Tagged File 8 is next processed by the Objective Analysis Module 9 as depicted in FIG. 4, which may reside on the same computer or different digital device. This module 9 further processes values from the Intelligently Tagged File 8 in preparation for presentation. The Text Time Factor 95 is the first factor in the delivery of text for display and controls the length of time each word or cognitive cluster is displayed while in the Zero Eye Movement (ZEM) mode. It is the result of the processing by the Blending Distillation Engine 93 of both the Recognition value 91 and the Comprehensibility value 92 along with the Tempo value 97 (if available). The proportional weight given to these values in calculating the Text Time Factor 95 is set by using the Text Time Control 941 of the Property Editor 94. Since this value is used to set the length of time words or cognitive clusters are displayed according to the need of the reader to process them, there may be a great difference in preferences between users as to which value should be given greatest weight. For instance, a person with a mild case of dyslexia may want to give more weight to those words which have a high recognizability value, while a person who has a limited vocabulary might prefer the opposite.

The second factor is Text Color Factor 96 and it indicates what color property is assigned to each word or cognitive cluster based upon its part of speech. It can be used either to print on paper, or for either standard or Zero Eye Movement (ZEM) display on an electronic display device. The color is assigned by the Text Color Control 942 of the Property Control Editor 94 through the Blending Engine 93 which uses the Part of Speech value 98 and a user modifiable Preference File 993 for determining the color to assign.

The third factor is the Text Opacity Factor 99. It varies the amount of opacity which is used to display a word or cognitive cluster to indicate importance. By using increased opacity for important or difficult words, increased attention can be given to them by the reader. It can be used either to print on paper, or used for either standard or Zero Eye Movement (ZEM) display on an electronic display device. The Text Opacity property 996 is assigned through the Blending Engine 93 and is also the result of processing both the Recognition Value 91 and the Comprehensibility Value 92 with control of the weighting of each value being provided by the Text Opacity Control 943 of the Property Control Editor 94. The weighting may be the same or different from that used to control display time.

The author can modify Appearance properties 997 with the Appearance Control 944 of the Property Editor 94 through the Reduction Engine 991. With this editor 94 the author can edit the color or pattern of the background, and choose the size and typeface in which the text is to be displayed.

The author can modify Image properties 998 with the Imagery Control 945 of the Property Editor 94 through the Reduction Engine 991. With this editor 94 the author can edit the opacity of images.

The author can also modify Audio Element 999 through the Audio Control 946 of the Property Editor 94. With the editor 94 the author can edit the volume and the tone qualities of the audio.

Since some presentation devices such as pagers or cell phones are incapable of using all the presentation techniques available to more powerful machines a process is provided for combining properties such as the Recognizability 91, Comprehensibility 92, and Tempo 97 values into one value and leaving out the rest of the values entirely which allows the presenting device to display the words in a more easily comprehendible manner with reduced bandwidth. This is accomplished through the Reduction Engine 991 which is controlled by the Device Accommodation Editor 992. This results in the creation of a Property Deliverable File 10.

The resulting Property Deliverable File 10 is then processed through the Delivery Display Module 11 depicted in FIG. 5. It is first processed by the Display Engine 111 of the Delivery Display Module 11 to either print the document with the addition of the coloring of the parts of speech and the use of varying opacity for emphasis, or for display on an electronic device with the previously mentioned properties or by using the automated flow method Zero Eye Movement. The Delivery Selector 112 is used to select the method of output. When used for printing, the Text Color Hue property 1151 can be used to print different colors indicative of each part of speech. Studies have shown that such differentiation can increase reading comprehension. Also, words or cognitive clusters that are valued more highly can be printed with the highest opacity while those which are valued as less important can be printed less opaquely.

An important and useful purpose for this system is for use on electronic display devices using the technique often referred to as "zero eye movement" (ZEM) or "rapid serial visual presentation" (RSVP). This technique rapidly flashes words or small groups of words on the screen at a user controllable speed. Compensation has been given for difficulty in reading longer words by slowing the presentation, and pauses have been given at the end of phrases and sentences according to punctuation within other methods of ZEM however, neither recognizability nor comprehension factors have been considered. Through the Refined File's Text Display Time property 1161 (derived from the previously described analysis processes), control of the display time for each word is provided in such a way as to display the words in a rhythm more closely matched to that at which a reader might normally adopt if reading in the traditional manner.

Using the Delivery and Display Module 11 as depicted in FIG. 5, the user can both control the presentation in real time and customize certain aspects of the presentation. It is through the User Control's 114 Flow Control 1141 that the user controls sets the Text Display Time 1161 starting, pausing, and stopping the presentation, speeding and slowing the presentation in real time, and controlling the length of time graphics, video or audio presentation, if not previously defined. User Control 114 also is used for rereading a sentence, paragraph or section of the document. The user can also set the starting speed, set a speed increase over a defined period of time or number of words (acceleration), set the difference in display time between the shortest and longest lengths of display (compression), and set a minimum value for a word to be displayed (exclusion). This control also enables the user to view only sections of the document which have been previously marked using the Mark Up Control 1142.

Through the Mark Up Control 1142 the user can hold down a key while viewing a section of a document and mark it for future reference. The section that is marked can then be displayed with a different colored background than otherwise and will be uniquely selectable for independent display or copying for other use.

The Appearance Control 1143 enables the user to determine the color saturation and the color of the background both for the normal text and for text that has been highlighted for the Text Color Hue 1162. It also allows the user to vary the font, size, and background.

The Audio Control 1144 is used to control volume.

The Imagery Control 1145 is used to control whether graphics will be displayed, and to choose the size and opacity of the graphic or video.

While the invention is described with reference to the structures and processes disclosed, it is not confined to the details set forth, but is intended to cover such modifications or changes as may fall within the scope of the following claims.

What is claimed is:

1. A computer system for presenting an electronic document to a viewer to facilitate comprehension and control display and speed of delivery, comprising:
   a plurality of knowledge databases in the computer system for use in assigning an emphasis value to each word in the electronic document;
   an annotation module in the computer system including a cognitive cluster parser configured to group selected word pairings as cognitive clusters to be treated as one word and an analysis engine configured to assign an emphasis value to each word and cognitive cluster, the cognitive cluster parser and analysis engine interacting to generate a first tagged file of assigned emphasis values for each word and cognitive cluster;
   a first analysis module in the computer system including a compiler engine configured to derive emphasis values for recognizability and comprehensibility and an author interface configured to facilitate tag editing, the first analysis module for processing the first tagged file to generate a second tagged file of derived emphasis values;
   a second analysis module in the computer system including a property editor configured to facilitate editing of properties of selected words and cognitive clusters in the electronic document, the second analysis module for processing the second tagged file to generate a deliverable file that dynamically controls the presentation of the electronic document to the viewer;
   a printer or an electronic display device; and
   a delivery display module operative with the property deliverable file and the printer or electronic display device to at least one of print or display the electronic document.

2. The system for presenting an electronic document of claim 1 wherein the plurality of knowledge databases comprises at least one of a cognitive cluster database, a rarity database, a graphical similarity database, a parts of speech database, and a context database.

3. The system for presenting an electronic document of claim 2, wherein the cognitive cluster parser interacts with the cognitive cluster database to create a cognitively parsed file.

4. The system for presenting an electronic document of claim 3 wherein the analysis engine determines a number of characters in each cognitive cluster and assigns a character count value to each cognitive cluster.

5. The system for presenting an electronic document of claim 2, wherein the analysis engine compares each word with the rarity database to assign a rarity value to each word.

6. The system for presenting an electronic document of claim 2 wherein the analysis engine compares each word with the graphical similarity database to assign a similarity value to each word.

7. The system for presenting an electronic document of claim 2 wherein the analysis engine compares each word, along with a plurality of surrounding words in the electronic document, with the parts of speech database to determine the part of speech of each word and assign a corresponding part of speech value to each word.

8. The system for presenting an electronic document of claim 2 wherein the analysis engine compares each word, along with a plurality of surrounding words in the electronic document, with the context database to determine an importance value for each word based on context.

9. The system for presenting an electronic document of claim 1 wherein the analysis engine determines a redundancy value for each word that is indicative of a frequency of occurrence of the word in the electronic document.

10. The system for presenting an electronic document of claim 1 wherein the analysis engine determines each word in the electronic document that is capitalized and assigns a corresponding capitalization value.

11. The system for presenting an electronic document of claim 1 wherein the analysis engine determines a relative position of each word in a sentence and assigns a position value to each word.

12. The system for presenting an electronic document of claim 1 wherein the analysis engine determines a number of characters in each word and assigns a character count value to each word.

13. The system for presenting an electronic document of claim 1 wherein the compiler engine is operative with a ratio definition function of the author interface and processes the assigned emphasis values in the first tagged file to derive a recognizability value and a comprehensibility value for each word that are included in the second tagged file.

14. The system for presenting an electronic document of claim 13 wherein the author interface includes a recognizability and a comprehensibility editor function to alter a derived recognizability value and a derived comprehensibility value for each word or a portion of the electronic document.

15. The system for presenting an electronic document of claim 1 wherein the compiler engine is operative with a tempo function of the author interface to generate a tempo value for each word that is used to manipulate a rate of presentation for a section of the electronic document.

16. The system for presenting an electronic document of claim 1 wherein the compiler engine is operative with an image file and an audio file.

17. The system for presenting an electronic document of claim 16 wherein the author interface includes an image editor function to control an addition and a placement of a pointer to the image file in the second tagged file.

18. The system for presenting an electronic document of claim 16 wherein the author interface includes an audio editor function to control an addition and a placement of a pointer to the audio file in the second tagged file.

19. The system for presenting an electronic document of claim 1 wherein the second analysis module further comprises a blending engine that interacts with the property editor to process the second tagged file.

20. The system for presenting an electronic document of claim 19 wherein the property editor includes a text time control that is operative with the blending engine to generate a text time factor for the property deliverable file, the text time factor being used to set an amount of time that each word and cognitive cluster is displayed to the viewer.

21. The system for presenting an electronic document of claim 19 wherein the property editor includes a text color control that is operative with the blending engine and a user preference file to assign a color property that is indicative of a part of speech to each word and cognitive cluster.

22. The system for presenting an electronic document of claim 19 wherein the property editor includes a text opacity control that is operative with the blending engine and a recognition value and a comprehensibility value that are included in the second tagged file to assign a text opacity property to each word and cognitive cluster.

23. The system for presenting an electronic document of claim 22 wherein the text opacity property to each word and cognitive cluster is indicative of an importance or a difficulty associated with each word and cognitive cluster.

24. The system for presenting an electronic document of claim 19 wherein the second analysis module further comprises a reduction engine that interacts with an appearance control of the property editor to select a background color or pattern and to select a size and a typeface display of the electronic document to a viewer.

25. The system for presenting an electronic document of claim 24 wherein the property editor includes an imagery control that is operative with the reduction engine to enable an author to change an opacity of images in an image file associated with the electronic document.

26. The system for presenting an electronic document of claim 24 wherein the property editor includes an audio control that is operative with the reduction engine to enable an author to change a volume and an tone quality of audio in an audio file associated with the electronic document.

27. The system for presenting an electronic document of claim 24 wherein the second analysis module further comprises a device accommodation editor that is operative with the reduction engine to combine a plurality of values in the second tagged file to generate a property deliverable file that controls the presentation of the electronic document on a hand held device.

28. The system for presenting an electronic document of claim 27 wherein the hand held device includes at least one of a cellular phone, a pager, and a personal digital assistant.

29. The system for presenting an electronic document of claim 1 wherein the delivery display module comprises a display engine that processes the property deliverable file to control printing of the electronic document.

30. The system for presenting an electronic document of claim 1 wherein the delivery display module comprises a display engine that processes the property deliverable file to control display of the electronic document on the electronic display device.

31. The system for presenting an electronic document of claim 30 wherein the delivery display module further comprises a user interface engine that is operative with the display engine, and a user control for customizing at least one aspect of the presentation of the electronic document.

32. The system for presenting an electronic document of claim 31 wherein the user control includes at least one of a flow control function, a mark up function, an appearance control function, an audio control function, and an imagery control function.

33. The system for presenting an electronic document of claim 32 wherein the flow control function enables a viewer to set at least one of an initial speed of presentation, an increase in speed over a defined period or number of words, a difference in display time between a shortest length and a longest length of display, and a minimum value for a word to be displayed.

34. The system for presenting an electronic document of claim 32 wherein the mark up function enables the viewer to mark up a section of the electronic document for a subsequent viewing of the section.

35. The system for presenting an electronic document of claim 32 wherein the appearance control function enables the viewer to select a color saturation and a background color for display of the electronic document.

36. The system for presenting an electronic document of claim 32 wherein the audio control function enables the viewer to control a volume of an audio file associated with the electronic document.

37. The system for presenting an electronic document of claim 32 wherein the imagery control function enables the viewer to control whether an image file will be displayed with the electronic document, and enables the viewer to select a size and opacity for the displayed image file.

38. The system for presenting an electronic document of claim 1 wherein the delivery display module comprises a delivery selector control to select printing of display of the electronic document.

39. A method for presenting an electronic document to a viewer to facilitate comprehension and control display and speed of delivery, comprising the steps of:
   assigning an emphasis value to each word in the electronic document using a knowledge database thereby generating a first tagged file of assigned emphasis values for each word;
   processing the first tagged file in a computer system, including deriving emphasis values for recognizability and comprehensibility and pairing selected words as a cognitive cluster to be treated as one word, to generate a second tagged file of derived emphasis values;
   processing the second tagged file in the computer system, including facilitating editing of properties of selected words and cognitive clusters in the electronic document, to generate a property deliverable file that dynamically controls the presentation of the electronic document to the viewer; and
   presenting the electronic document to the viewer on an electronic display device or printer.

40. The method for presenting an electronic document of claim 39 wherein the knowledge database comprises at least one of a cognitive cluster database, a rarity database, a geographical similarity database, a part of speech database, and a context database.

41. The method for presenting an electronic document of claim 40 further comprising the step of comparing each word with the rarity database to assign a rarity value to each word.

42. The method for presenting an electronic document of claim 40 further comprising the step of comparing each word with the graphical similarity database to assign a similarity value to each word.

43. The method for presenting an electronic document of claim 40 further comprising the steps of comparing each word, along with a plurality of surrounding words in the electronic document, with the parts of speech database to determine the part of speech of each word, and assigning a part of speech value to each word.

44. The method for presenting an electronic document of claim 40 further comprising the step of comparing each word, along with a plurality of surrounding words in the electronic document, with the context database to determine an importance value for each word based upon context.

45. The method for presenting an electronic document of claim 39 further comprising the step of creating a cognitively parsed file.

46. The method for presenting an electronic document of claim 45 further comprising the steps of determining a number of characters in each cognitive cluster and assigning a character count value to each cognitive cluster.

47. The method for presenting an electronic document of claim 45 further comprising the step of generating a text time factor for the property deliverable file to set an amount of time that each word and cognitive cluster is displayed to a viewer.

48. The method for presenting an electronic document of claim 45 further comprising the step of assigning a color property that is indicative of a part of speech to each word and cognitive cluster.

49. The method for presenting an electronic document of claim 45 further comprising the step of assigning a text opacity property to each word and cognitive cluster that is indicative of an importance or difficulty associated with each word and cognitive cluster.

50. The method for presenting an electronic document of claim 39 further comprising the step of determining a redundancy value for each word that is indicative of a frequency of occurrence of the word in the electronic document.

51. The method for presenting an electronic document of claim 39 further comprising the steps of determining each word in the electronic document that is capitalized and assigning a capitalization value to the corresponding word.

52. The method for presenting an electronic document of claim 39 further comprising the steps of determining a relative position of each word in a sentence and assigning a position value to each word.

53. The method for presenting an electronic document of claim 39 further comprising the steps of determining a number of characters in each word and assigning a character count value to each word.

54. The method for presenting an electronic document of claim 39 further comprising the step of processing the assigned emphasis values in the first tagged file to derive a recognizability value and a comprehensibility value for each word for inclusion in the second tagged file.

55. The method for presenting an electronic document of claim 39 further comprising the step of generating a tempo value for each word to manipulate a rate of presentation for a section of the electronic document.

56. The method for presenting an electronic document of claim 39 further comprising the steps of adding and placing a pointer to an audio file in the second tagged file.

57. The method for presenting an electronic document of claim 39 further comprising the steps of adding and placing a pointer to an audio file in the second tagged file.

58. The method for presenting an electronic document of claim 39 further comprising the step of editing the derived recognizability value and the derived comprehensibility value for each word or a portion of the electronic document.

59. The method for presenting an electronic document of claim 39 further comprising the steps of selecting a background color or pattern, and selecting a size and typeface for display of the electronic document to the viewer.

60. The method for presenting an electronic document of claim 39 further comprising the step of changing an opacity of images in an image file associated with the electronic document.

61. The method for presenting an electronic document of claim 39 further comprising the step of changing a volume and a tone quality of audio in an audio file associated with the electronic document.

62. The method for presenting an electronic document of claim 39 wherein the step of processing the second tagged file comprises combining a plurality of values in the second tagged file to generate the property deliverable file.

63. The method for presenting an electronic document of claim 39 further comprising the step of processing the property deliverable file to control display of the electronic document on the electronic display device.

64. The method for presenting an electronic document of claim 39 further comprising the step of customizing the presentation of the electronic document.

65. The method for presenting an electronic document of claim 64 wherein the step of customizing comprises at least one of setting an initial speed of presentation, setting an increase in speed over a define period or a number of words, setting a difference in display time between the shortest length and a longest length of display, and setting a minimum value for a word to be displayed.

66. The method for presenting an electronic document of claim 64 wherein the step of customizing comprises the step of enabling the viewer to mark up a section of the electronic document for a subsequent viewing of the section.

67. The method for presenting an electronic document of claim 64 wherein the step of customizing comprises the step of enabling the viewer to select a color saturation and a background color for display of the document.

68. The method for presenting an electronic document of claim 64 wherein the step of customizing comprises the step of enabling the viewer to control a volume of an audio file associated with the electronic document.

69. The method for presenting an electronic document of claim 64 wherein the step of customizing comprises the step of enabling the viewer to control a size and opacity of an image document displayed in conjunction with the electronic document.

70. A computer system for presenting an electronic document to a viewer to facilitate comprehension and control display and speed of delivery, the computer system including a computer program product, the computer program product comprising:
   program instructions that group selected words into a cognitive cluster to be treated as a single word;
   program instructions that assign an emphasis value to each word and cognitive cluster in the electronic document using a knowledge database thereby generating a first tagged file of assigned emphasis values for each word and cognitive cluster;
   program instructions that process the first tagged file, including deriving emphasis values for recognizability and comprehensibility, to generate a second tagged file of derived emphasis values;
   program instructions that process the second tagged file, including facilitating editing of properties of selected words and cognitive clusters in the electronic document, to generate a property deliverable file that dynamically controls the presentation of the electronic document to the viewer;
   a printer or an electronic display device; and
   program instructions that present the electronic document to the viewer on the electronic display device or to the printer.

71. The computer system for presenting an electronic document of claim 70 wherein the knowledge database comprises at least one of a cognitive cluster database, a graphical similarity database, a part of speech database, and a context database.

72. The computer system for presenting an electronic document of claim 71 wherein the computer program product further comprises program instructions that compare each word with the rarity database to assign a rarity value to each word.

73. The computer system for presenting an electronic document of claim 71 wherein the computer program product further comprises program instructions that compare each word of with the graphical similarity database to assign a similarity value to each word.

74. The computer system for presenting an electronic document of claim 71 wherein the computer program product further comprises program instructions that compare each word, along with a plurality of surrounding words in the electronic document, with the parts of speech database to determine the part of speech of each word and assign a part of speech value to each word.

75. The computer system for presenting an electronic document of claim 71 wherein the computer program product further comprises program instructions that compare each word, along with a plurality of surrounding words in the electronic document, with the context database to determine an importance value for each word based on context.

76. The computer system for presenting an electronic document of claim 70 wherein the computer program product further comprises program instructions that generate a cognitively parsed file.

77. The computer system for presenting an electronic document of claim 76 wherein the computer program product further comprises program instructions that determine a number of characters in each cognitive cluster and assign a character count value to each cognitive cluster.

78. The computer system for presenting an electronic document of claim 76 wherein the computer program product further comprises program instructions that generate a text time factor for the property deliverable file to set an amount of time that each word and cognitive cluster is displayed to the viewer.

79. The computer system for presenting an electronic document of claim 76 wherein the computer program product further comprises program instructions that assign a color property that is indicative of a part of speech to each word and cognitive cluster.

80. The computer system for presenting an electronic document of claim 76 wherein the computer program product further comprises program instructions that assign a text opacity to each word and cognitive cluster that is indicative of an importance or difficulty associated with each word and cognitive cluster.

81. The computer system for presenting an electronic document of claim 70 wherein the computer program product further comprises program instructions that determine a redundancy value for each word that is indicative of a frequency of occurrence of the word in the electronic document.

82. The computer system for presenting an electronic document of claim 70 wherein the computer program product further comprises program instructions that compare each word in the electronic document that is capitalized and assign a capitalization value to the corresponding word.

83. The computer system for presenting an electronic document of claim 70 wherein the computer program product further comprises program instructions that determine a relative position of each word in a sentence and assign a position value to each word.

84. The computer system for presenting an electronic document of claim 70 wherein the computer program product further comprises program instructions that determine a number of characters in each word and assign a character count value to each word.

85. The computer system for presenting an electronic document of claim 70 wherein the computer program product further comprises program instructions that process the assigned emphasis values in the first tagged file to derive a recognizability value and a comprehensibility value for each word for inclusion in the second tagged file.

86. The computer system for presenting an electronic document of claim 70 wherein the computer program product further comprises program instructions that generate a tempo value for each word to manipulate a rate of presentation for a section of the electronic document.

87. The computer system for presenting an electronic document of claim 70 wherein the computer program product further comprises program instructions that add and place a pointer to an image file in the second tagged file.

88. The computer system for presenting an electronic document of claim 70 wherein the computer program product further comprises program instructions that add and place a pointer to an audio file in the second tagged file.

89. The computer system for presenting an electronic document of claim 70 wherein the computer program product further comprises program instructions that enable editing of the derived recognizability value and the derived comprehensibility value for each word or a portion of the electronic document.

90. The computer system for presenting an electronic document of claim 70 wherein the computer program product further comprises program instructions that enable selecting a size and typeface for display of the electronic document to the viewer.

91. The computer system for presenting an electronic document of claim 70 wherein the computer program product further comprises program instructions that enable changing of an opacity of images in an image file associated with the electronic document.

92. The computer system for presenting an electronic document of claim 70 wherein the computer program product further comprises program instructions that enable changing a volume and a tone quality of audio in an audio file associated with the electronic document.

93. The computer system for presenting an electronic document of claim 70 wherein the program instructions that process the second tagged file comprise program instructions that combine a plurality of values in the second tagged file to generate the property deliverable file.

94. The computer system for presenting an electronic document of claim 70 wherein the computer program product further comprises program instructions that process the property deliverable file to control display of the electronic document on the electronic display device.

95. The computer system for presenting an electronic document of claim 70 wherein the computer program product further comprises program instructions that customize the presentation of the electronic document.

96. The computer system for presenting an electronic document of claim 95 wherein the program instructions that customize comprise program instructions that enable at least one of setting an initial speed of presentation, setting an increase in speed over a define period or a number of words, setting a difference in display time between a shortest length and a longest length of display, and setting a minimum value for a word to be displayed.

97. The computer system for presenting an electronic document of claim 95 wherein the program instructions that customize comprise program instructions that enable the viewer to mark up a section of the electronic document for a subsequent viewing of the section.

98. The computer system for presenting an electronic document of claim 95 wherein the program instructions that customize comprise program instructions that enable the viewer to select a color saturation and a background color for display of the document.

99. The computer system for presenting an electronic document of claim 95 wherein the program instructions that customize comprise program instructions that enable the viewer to control a volume of an audio file associated with the electronic document.

100. The computer system for presenting an electronic document of claim 95 wherein the program instructions that customize comprise program instructions that enable the viewer to control a size and opacity of an image document displayed in conjunction with the electronic document.

* * * * *